UNITED STATES PATENT OFFICE 2,523,189

ESTERS OF 2,4-DICHLOROPHENOXY-ACETIC ACID

Edgar C. Britton and Louis E. Begin, Midland, Mich., assignors to The Dow Chemical Company, Midland, Mich., a corporation of Delaware No Drawing. Application May 22, 1948, Serial No. 28,735

10 Claims. (Cl. 260—473)

The present invention relates to esters of 2,4-dichlorophenoxy-acetic acid and is particularly concerned with compounds having the following formula:

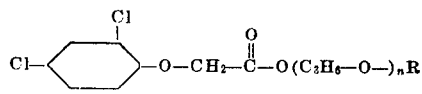

wherein $n$ is in an integer not greater than 2, and R represents a lower alkyl radical containing from 1 to 4 carbon atoms, inclusive. These compounds are adapted to be employed as modifiers in plastic compositions; preservatives for paper, wood, and cellulosic textiles; plant growth control materials; and as intermediates for the preparation of more complex organic derivatives.

The new esters are oils or crystalline solids, somewhat soluble in many organic solvents, and substantially insoluble in water. These compounds are stable to light and air, not appreciably affected by carbon dioxide, non-corrosive to the skin of man and higher animals, and of low volatility.

The compounds may be prepared by reacting a molecular proportion of (1) 2,4-dichlorophenoxy-acetic acid and (2) at least a molecular proportion of an alkyl monoether of mono- or dipropylene glycol such as methoxy-propanol, ethoxy-propanol, propoxy-propanol, butoxy-propanol, methoxy-propoxy-propanol, ethoxy-propoxy-propanol, propoxy-propoxy-propanol, and butoxy-propoxy-propanol. Better yields are obtained when an excess of the ether alcohol is employed, and the water of reaction is removed as formed. The reaction is carried out in the presence of a dehydration catalyst, such as sulphuric acid.

In the preferred method of preparation, 2,4-dichlorophenoxy-acetic acid, an excess of the glycol alkyl mono-ether, and the catalyst are mixed together and heated for one hour or longer at a temperature of 50° to 60° C. The reaction mixture is then heated under reduced pressure to remove water of reaction together with some of the excess of the ether-alcohol. Carbon tetrachloride or other water-immiscible solvent is then added to the mixture and the catalyst and unreacted 2,4-dichlorophenoxy-acetic acid neutralized with an alkali such as dilute aqueous sodium carbonate. The resulting mixture divides into aqueous and solvent layers. The solvent layer, which contains the ester reaction product, is separated and washed several times with water to extract the water-soluble salts of catalyst and unreacted 2,4-dichlorophenoxy-acetic acid. The solvent is then recovered by distillation under reduced pressure to obtain the desired ester compound.

In an alternative procedure, the reaction is carried out in a water-immiscible solvent, such as ethylene dichloride. Good yields are obtained when substantially equimolecular proportions of the ether-alcohol and 2,4-dichlorophenoxy-acetic acid are employed. The reactants and catalyst are dispersed in the solvent and heated together for two hours or longer at the boiling temperature of the mixture. A mixture of the solvent and water of reaction are continuously distilled out of the reaction vessel, condensed, and the solvent recovered. Additional solvent is introduced into the reaction zone as may be necessary. Upon completion of the reaction the mixture is neutralized, as with dilute aqueous sodium carbonate, and the solvent layer separated from the aqueous layer and washed several times with water to remove the water-soluble salts of catalyst and unreacted 2,4-dichlorophenoxy-acetic acid. The solvent is then removed by distillation under reduced pressure to obtain the ester product.

The mono- and dipropylene glycol alkyl monoethers employed in these preparations may be obtained by the reaction of propylene oxide with an aliphatic alcohol such as methanol, propanol, or butanol. The reaction is carried out in the presence of a catalyst such as sulphuric acid or sodium hydroxide. In one method of preparing the ether-alcohols the reactants are mixed and heated together in the presence of the catalyst for ½ hour at a temperature of 170° C. and a pressure of 200 pounds per square inch. The individual ether-alcohols are then separated by subjecting the mixed reaction product to fractional distillation at reduced pressure.

The following examples illustrate the invention but are not to be construed as limiting the same.

Example 1

221 grams (1 mole) of 2,4-dichlorophenoxy-acetic acid, 176 grams (1 mole) of isopropoxy-propoxy-propanol (boiling at 204° C. at 760 millimeters pressure), 200 milliliters of ethylene dichloride, and 2 milliliters of sulphuric acid were heated together for 2 hours at a pot temperature of 100° to 130° C. The operation was carried out with continuous distillation of ethylene dichloride together with the water of reaction as formed, separation of the water, and recycling of the ethylene dichloride. Upon completion of the reaction the mixture was neutralized with dilute aqueous sodium carbonate. The solvent and aqueous layers were separated and the solvent layer washed several times with water to extract the water-soluble salts of catalyst and unreacted 2,4-dichlorophenoxy-acetic acid. The ethylene dichloride was then removed by distillation at reduced pressure, to obtain the isopropoxy-propoxy-propyl ester of 2,4-dichlorophenoxy-acetic acid. This product was an oily liquid having a refractive index $(n_D)$ of 1.498 at 60° C. and a chlorine content of 18.9 per cent. The theoretical chlorine content for $C_{17}H_{24}Cl_2O_5$ is 18.7 per cent.

*Example 2*

442 grams (2 moles) of 2,4-dichlorophenoxy-acetic acid, 396 grams (3 moles) of 1-butoxy-2-propanol (boiling at 170° C. at 760 millimeters pressure) and 2 milliliters of sulphuric acid were heated together for one hour at a temperature of 50° to 65° C. The reaction mixture was then placed under reduced pressure and the temperature gradually increased to distill a mixture of water and butoxy-propanol out of the reaction zone, until the pot temperature reached 110° C. and no more water was given off. The mixture was diluted with carbon tetrachloride, and neutralized with dilute aqueous sodium carbonate. The solvent layer was then separated and washed several times with water to extract the water-soluble salts of catalyst and unreacted 2,4-dichlorophenoxy-acetic acid. The carbon tetrachloride was recovered by distillation at reduced pressure to obtain the 1-butoxy-2-propyl ester of 2,4-dichlorophenoxy-acetic acid. This product was an oily liquid having a refractive index $(n_D)$ of 1.506 at 60° C., and a chlorine content of 21.1 per cent while the theoretical chlorine content for $C_{15}H_{20}Cl_2O_4$ is 21.2 per cent.

*Example 3*

442 grams (2 moles) of 2,4-dichlorophenoxy-acetic acid, 570 grams (3 moles) of butoxy-propoxy-propanol (boiling at 228° C. at 760 millimeters pressure), and 2 milliliters of sulphuric acid were heated together for one hour at a temperature of 50° to 65° C. The mixture was then heated at a pressure of 130 millimeters to drive off water of reaction in admixture with butoxy-propoxy-propanol. Heating was continued until the reaction mixture had reached a pot temperature of 123° C. and no more water was evolved. The resulting mixture was then treated as described in Example 2 to obtain the butoxy-propoxy-propyl ester of 2,4-dichlorophenoxy-acetic acid. This product was an oily liquid having a refractive index $(n_D)$ of 1.497 at 60° C., a chlorine content of 17.9 per cent, and a saponification number of 144. The theoretical chlorine content and saponification number for $C_{18}H_{26}Cl_2O_5$ are 18.0 per cent and 145, respectively.

*Example 4*

221 grams (1 mole) of 2,4-dichlorophenoxy-acetic acid, 118 grams (1 mole) of 1-isopropoxy-2-propanol (boiling at 139° C. at 760 millimeters pressure), 200 milliliters of ethylene dichloride, and 2 milliliters of sulphuric acid were reacted together by the method of Example 1 to obtain the 1-isopropoxy-2-propyl ester of 2,4-dichlorophenoxy-acetic acid. This product was an oily liquid having a refractive index $(n_D)$ of 1.5122 at 60° C., and a chlorine content of 22.8 per cent while the theoretical chlorine content for $C_{14}H_{18}Cl_2O_4$ is 22.0 per cent.

*Example 5*

The 2-methoxy-1-propyl ester of 2,4-dichlorophenoxy-acetic acid was prepared from 2,4-dichlorophenoxy-acetic acid and 2-methoxy-1-propanol (boiling at 130° C. at 750 millimeters pressure) by the method of Example 1. This ester was an oily liquid having a refractive index $(n_D)$ of 1.521 at 60° C., a chlorine content of 24.9, and a saponification number of 190. The theoretical chlorine content and saponification number for $C_{12}H_{14}Cl_2O_4$ are 24.2 per cent and 191, respectively.

We claim:

1. The esters of 2,4-dichlorophenoxy-acetic acid having the formula:

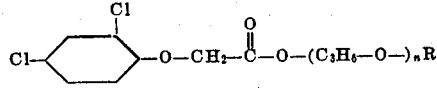

wherein $n$ is an integer not greater than 2, and R represents an alkyl radical containing from 1 to 4 carbon atoms, inclusive.

2. The esters of 2,4-dichlorophenoxy-acetic acid having the formula:

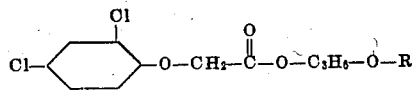

wherein R represents an alkyl radical containing from 1 to 4 carbon atoms, inclusive.

3. The esters of 2,4-dichlorophenoxy-acetic acid having the formula:

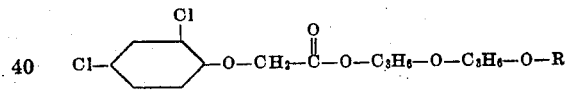

wherein R represents an alkyl radical containing from 1 to 4 carbon atoms, inclusive.

4. The butoxy-propoxy-propyl ester of 2,4-dichlorophenoxy-acetic acid.

5. The 1-butoxy-2-propyl ester of 2,4-dichlorophenoxy-acetic acid.

6. The 1-propoxy-2-propyl ester of 2,4-dichlorophenoxy-acetic acid.

7. The butoxy-propyl ester of 2,4-dichlorophenoxy-acetic acid.

8. The 1-isopropoxy-2-propyl ester of 2,4-dichlorophenoxy-acetic acid.

9. The isopropoxy-propoxy-propyl ester of 2,4-dichlorophenoxy-acetic acid.

10. The propoxy-propoxy-propyl ester of 2,4-dichlorophenoxy-acetic acid.

EDGAR C. BRITTON.
LOUIS E. BEGIN.

REFERENCES CITED

The following references are of record in the file of this patent:

UNITED STATES PATENTS

| Number | Name | Date |
|---|---|---|
| 2,142,126 | Grether | Jan. 3, 1939 |
| 2,166,557 | Stoesser et al. | July 18, 1939 |
| 2,322,760 | Lontz | June 29, 1943 |
| 2,396,513 | Jones | Mar. 12, 1946 |